Nov. 11, 1958  E. C. ELSNER  2,859,710
RAIL-CONNECTED FITTING
Filed July 12, 1956
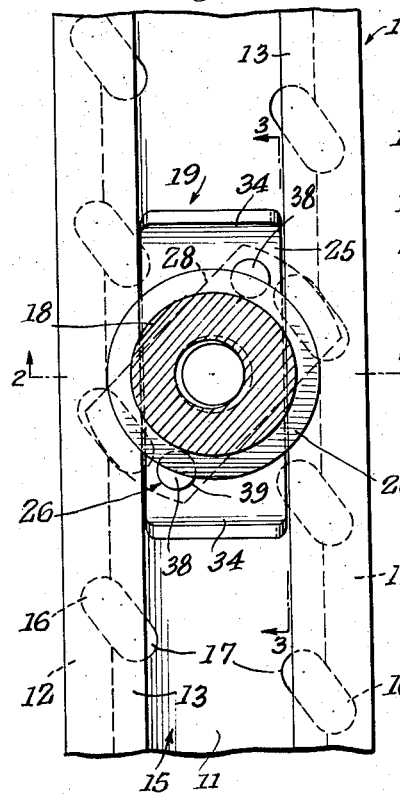
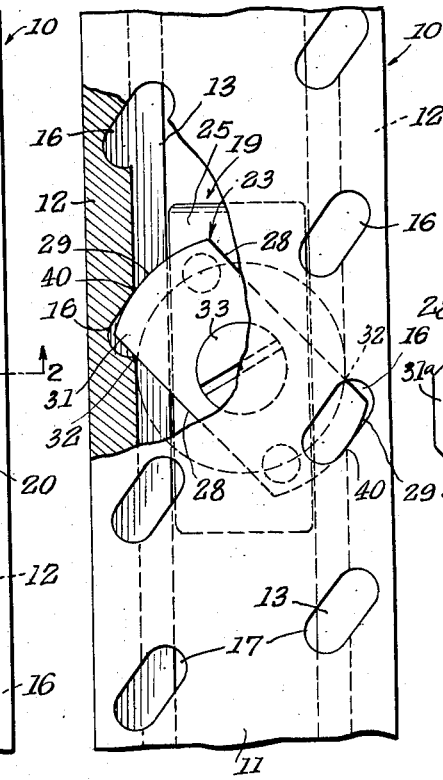
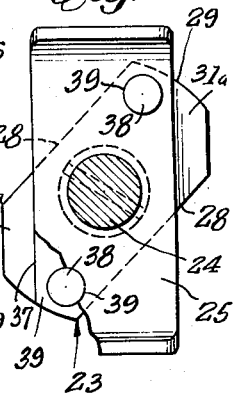
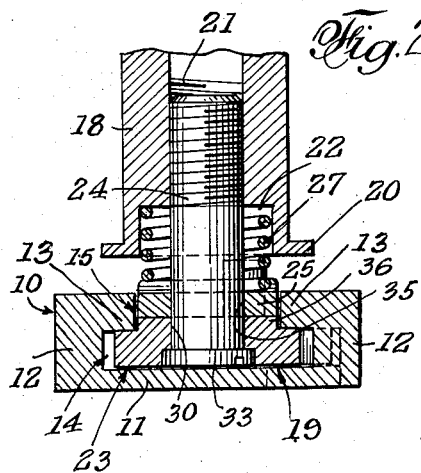
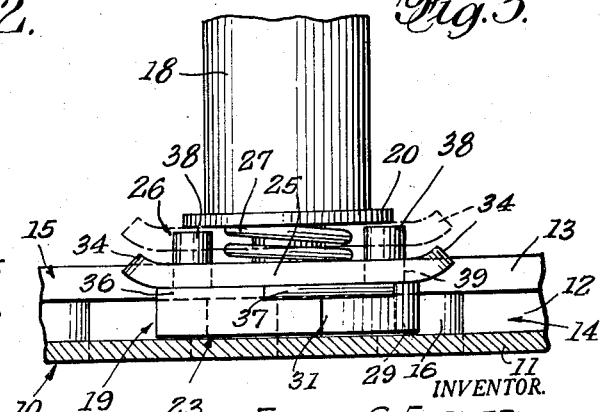
INVENTOR.
EDWIN C. ELSNER
BY C. G. Stratton
ATTORNEY

United States Patent Office 2,859,710
Patented Nov. 11, 1958

2,859,710

RAIL-CONNECTED FITTING

Edwin C. Elsner, Glendale, Calif., assignor, by mesne assignments, to Aeroquip Corporation, Jackson, Mich., a corporation of Michigan Application July 12, 1956, Serial No. 597,418

8 Claims. (Cl. 105—369)

This invention relates to fittings that are more particularly adapted for connection to a rail and, while adapted for general application, have particular usefulness in aircraft and in other places for securing chairs, tables, etc. to floors or decks, for mounting and retaining the position of stanchions, partitions, etc., and, generally, in connection with cargo tie-down arrangements.

An object of the present invention is to provide a quickly attachable and as quickly detachable fitting for the foregoing and comparable purposes that is simple, compact, and of strong construction and which may be operated with easy facility.

Fittings of the instant character are devised for engagement with a floor rail to resist displacement in an upward direction or direction transverse the plane of the rail face. Another object of the invention is to provide a fitting of the character referred to that has such engagement with a rail and in which the engagement may be quickly released and re-established, as desired.

A further object of the invention is to provide a rail-connected fitting of the character above referred to that has a selected connection which is fixed-against longitudinal shift or, optionally, is not so fixed. Thus, the four legs of a chair may be provided with the present fitting, two of the type that lock to a fixed position and two of the non-locking type, and the chair connected to a pair of parallel rails so as to be non-shiftable and the four fittings so engaging the rails as to prevent the mentioned upward displacement of the chair relative to the rails.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a top plan view showing a sectional view of a mounting rail and the present fitting in operative position thereon.

Fig. 2 is a cross-sectional view as taken on line 2—2 of Fig. 1.

Fig. 3 is a longitudinal sectional view as taken on line 3—3 of Fig. 1.

Fig. 4 is a bottom plan view, partly broken.

Fig. 5 is a plan sectional view showing the fitting modified to be non-locking.

The rail 10 is formed to have a bottom web 11, side walls 12 extending from the side edges of the web, and inturned flanges 13 extending from the upper edges of said walls. Thus, the rail 10 comprises an elongated channel having a relatively wider longitudinal passage 14 between the walls 12 and a relatively narrower slideway 15 between the flanges 13.

The above generally conventional rail 10, according to the present invention, is provided with a plurality of longitudinally spaced pairs of recesses 16 formed in the inner faces of the side walls 12. The recesses of each pair thereof are obliquely displaced, as shown in Figs. 1 and 4. While the recesses may be formed in various ways, the same are shown as resulting from milled slots 17 machined from the bottom of the rail through web 11 and for the height of side walls 12 and not affecting the flanges 13. The slots 17 are shown as end-closed for greater strength but the same may be opened by being extended to the side edges of the rail.

The member 18 represents a chair leg, stanchion or other element that is to be connected to the rail 10 by the present fitting 19. The particular design of member 18 is not material to the invention, the same being here shown as a cylindrical member provided with a bottom outturned flange 20, a longitudinal internal threaded passage 21, and a counterbore 22 in its lower end and at which passage 21 terminates.

The fitting 19 comprises, generally, a body 23 adapted to reside in the rail passage 14, a stud 24 interconnecting said body and the member 18, a slide and release plate 25 mounted on the stud between the body 23 and said member 18 and adapted for sliding engagement in slideway 15, a slidable and non-rotational connection 26 between said body and the plate 25, and a spring 27 preferably encircling stud 24, residing partly in counterbore 22, and engaging plate 25 to bias the same in a direction toward the body 23.

The body 23 is shown as a plate-like member having a thickness somewhat greater than the height of passage 14 (Figs. 2 and 3). The width of said body between sides 28 is such as to freely fit between rail flanges 13, and the length is such as to fit between the opposed pair of walls 29 of each pair of obliquely arranged pair of recesses 16. A central hole 30 in the body accommodates stud 24, said body being rotational on the stud between a position aligned with passage 14 and slideway 15 and an oblique position with diagonally opposite corners or wings 31 in the recesses 16 and as limited by engagement of sides 28 with abutments 32. In order that such rotational adjustment of the body may be effected, the mentioned corners 31 are reduced in thickness to be freely received between rail web 11 and flanges 13.

It will be seen that said corners 31 of the body 23 have a two-fold purpose; first they engage within the obliquely arranged recesses 16 of the rail and second, they are confined between the rail web and flanges to obviate displacement in a direction away from the web. By removing those portions of the corners 31 that are engaged in the recesses 16 but retaining those portions 31a that reside between the rail web and flanges, as shown in Fig. 5, the body will be held against displacement away from the rail web and may assume any longitudinal-position in the rail whether or not in registration or alignment with the recesses 16.

The stud 24 is threadedly engaged in the threaded passage 21 of the member 18 and is provided with a head 33 that retains the body 23 in rotational assembly with said member.

The slide and release plate 25 has a width to freely slide in the slideway 15 and has an arbitrary length somewhat greater than the length of the body. The ends 34 of said plate are preferably upturned, as shown, to provide finger-engageable end portions. A central hole 35 in said plate passes stud 24. In practice the thickness of plate 25 is such that together with the body, the height of walls 12 and flanges 13 of the rail is equalled. Thus, as seen in Fig. 2, when the body corners 31 or 31a, as the case may be, are disposed between the rail web and flanges, the top of plate 25 will be substantially flush with the top of the rail. It will be noted that plate 25 is somewhat thinner than the rail flanges 13, the difference being the thickness of the body over the thickness of the corners 31 and 31a. This difference 36 is defined between sides 37 of the body which have a transverse spacing equal to the width of plate 25 and is longitudinally aligned with said plate.

The slidable connection 26 maintains the above-mentioned alignment between the body 23 and the plate 25 and is here shown as a pair of pins 38 extending upwardly from opposite ends of the body and through suitable clearance and non-binding holes 39 in plate 25, of course, the connection 26 is provided where the body and plate are superimposed.

The spring 27 has one end seated against the bottom of counterbore 22 and its opposite end pressing against the plate 25 which, therefore, is resiliently held against the body 23.

When the fitting 19 is to be assembled onto the rail 10 to secure member 18 to said rail, the body 23 thereof is passed through slideway 15. The plate 25, being obliquely disposed, engages the tops of rail flanges 13 to arrest the movement of the body toward the rail web 11. By placing pressure on member 18 to compress spring 27, the body is depressed until the same rests against said rail web. Now, the plate 25 may be turned on the axis of stud 24 until it becomes aligned with slideway 15 and enters the same. Since connection 26 turns the body, as the plate 25 is turned, the corners or wings 31 slide beneath rail flanges 13. By suitable longitudinal adjustment of the fitting, said corners find an obliquely opposed pair of recesses 16, thereby locking the fitting against endwise movement and also against movement in a direction away from the rail web 11. In substantially the same way, a fitting such as shown in Fig. 5, will be connected to the rail but will not be locked except against movement normal to the plane of the rail, as above indicated.

Removal of the fitting is effected by gripping the ends 34 of plate 25, lifting said plate out of the slideway 15, as indicated by the dot-dash lines of Fig. 3, and rotating said plate to an oblique position that will bring the body from its initially oblique position to a position aligned with slideway 15. Thus the fitting may be extracted from or shifted to a position where the wings 31 may engage another pair of recesses 16.

The fitting shown in Figs. 1 to 4 may be used alone to secure a member, such as 18, to the rail. However, the fitting shown in Fig. 5 will not serve the same purpose but will necessarily be used in connection with the locking fitting. For instance, the four legs of a chair may be connected to two parallel rails by providing two legs with locking fittings (one for each rail) and the other two legs with non-locking fittings (also, one for each rail).

Since body 23 and plate 25 are relatively non-rotational and the latter is held aligned in slideway 15 by the flanges 13, the mentioned abutments 32 of recesses 16 cooperate with abutments 40 to lock the fitting having wings 31.

While the foregoing has illustrated and described what are now contemplated to be the best modes of carrying out the invention, the constructions are, of course, subject to modification without departing from the spirit and scope of invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. A fitting of the character described comprising an elongated body plate having diagonally opposed wing portions, an elongated rail having a longitudinal passage and a plurality of pairs of obliquely arranged and longitudinally spaced recesses opening into said passage, said recesses defining abutments, an elongated slide plate superimposed on the body plate, the width of each said plate being such as to longitudinally and slidingly fit the passage in the rail, means connecting said plates obliquely relative to each other and for movement of the slide plate toward and away from the body plate, each plate, selectively, being oblique to the rail passage when the other is in said passage, a stud constituting a common member on the axis of which both the body plate and the slide plate are rotatably mounted, said stud being adapted to be connected to a member which the fitting connects to the rail, and means resiliently biasing the plates toward each other to hold the body plate obliquely in said passage with the wings thereof in locking engagement with a pair of the mentioned abutments when the slide plate is aligned with the passage.

2. A fitting according to claim 1 in which the rail includes a pair of transversely spaced and inturned flanges defining the sides of said passage and also forming a slideway above and narrower than the passage, the slide plate being located in said slideway when the body plate is in locking engagement with the abutments.

3. A fitting according to claim 1 in which the rail includes a pair of transversely spaced and inturned flanges defining the sides of said passage and also forming a slideway above and narrower than the passage, the slide plate being located in said slideway when the body plate is in locking engagement with the abutments, the body plate including a thickened portion that extends into the slideway and between the rail flanges and abuts against the slide plate when the slide plate is in position in said slideway.

4. In combination, a rail having a web, side walls on the side edges of the web and inturned flanges on said walls to define a longitudinal passage between the walls and a narrower longitudinal slideway between the flanges, the walls being provided with a plurality of pairs of longitudinally-spaced and obliquely arranged abutment-defining recesses; a generally flat body plate disposed in the rail passage and provided with diagonally opposite wing portions engaged with the abutments of one pair of said recesses; a central stud extending from the body and outwardly through the rail slideway; a guide plate mounted on said stud and disposed in the slideway; said plates being the same width and each being adapted to be longitudinally moved in the rail slideway; and means connecting the body and guide plates against relative rotational movement around the axis of the stud to hold the two plates relatively obliquely to, thereby, hold the body wings engaged with the recess abutments while the guide plate is in position in the slideway and between the flanges.

5. In combination, a rail having a web, side walls on the side edges of the web and inturned flanges on said walls to define a longitudinal passage between the walls and a narrower longitudinal slideway between the flanges, the walls being provided with a plurality of pairs of longitudinally-spaced and obliquely arranged abutment-defining recesses; a generally flat body plate disposed in the rail passage and provided with diagonally opposite wing portions engageable with the abutments of one pair of said recesses; a central stud on which the body plate is rotatably mounted extending from the body plate and outwardly through the rail slideway; a guide plate rotatably mounted on said stud and disposed in the slideway; said plates being the same width and each being adapted to be longitudinally moved in the rail slideway; means connecting the body plate and guide plates against relative rotational movement around the axis of the stud to hold the two plates relatively obliquely to, thereby, hold the body wings engaged with the recesses abutments while the guide plate is in position in the slideway and between the flanges, and means producing a resilient biasing force on the guide plate and against which said guide plate is movable out of the slideway to free the same and the body plate for rotational movement around the axis of said stud.

6. In a fitting of the character described, a stud, a body plate and a guide plate superimposed on and slideably connected to the body plate, the body plate and the guide plate being rotatably mounted on the stud obliquely to each other and non-rotatable relative to each other, the body plate being provided with abutment-engaging, diagonally opposite portions, the guide plate being formed to have slideway-engaging side edges, and resilient means biasing the plate toward each other.

7. In a fitting according to claim 6, a sliding connection between the plates whereby one plate is movable against the resilient biasing means relative to the other.

8. In a fitting according to claim 6, the two plates being each generally rectangular and connected to each other in a mutually angular relationship with the diagonally-disposed portions of the body plate residing wholly outside the perimeter of the guide plate.

References Cited in the file of this patent
UNITED STATES PATENTS

| | | |
|---|---|---|
| 2,688,289 | Sterling | Sept. 7, 1954 |
| 2,736,272 | Elsner | Feb. 28, 1956 |